May 17, 1932. L. FRANDSEN 1,858,620

HOLLOW BRICK AND TILE MOLDING MACHINE

Filed March 19, 1929 2 Sheets-Sheet 1

Inventor
Lars Frandsen
By Martin P. Smith
Attorney

May 17, 1932.    L. FRANDSEN    1,858,620
HOLLOW BRICK AND TILE MOLDING MACHINE
Filed March 19, 1929    2 Sheets-Sheet 2
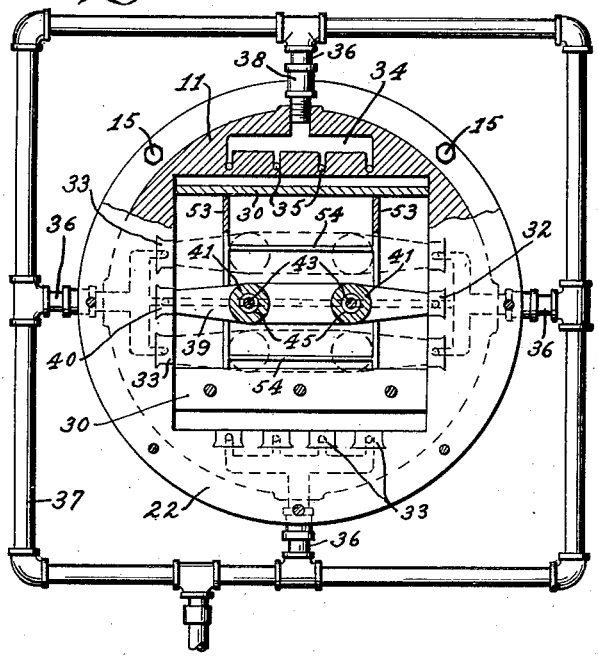
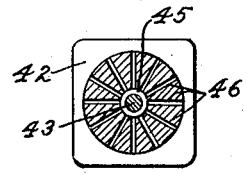
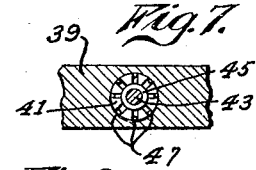
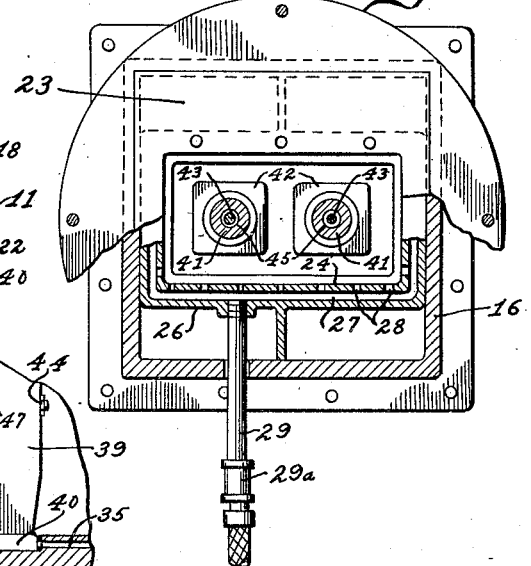
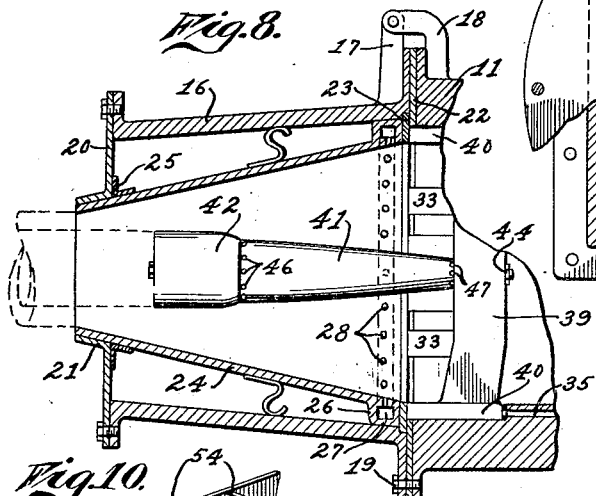
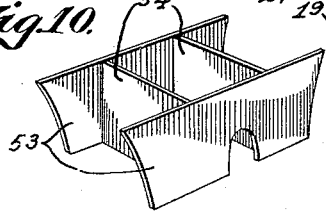
Inventor
Lars Frandsen Patented May 17, 1932

1,858,620

UNITED STATES PATENT OFFICE

LARS FRANDSEN, OF LOS ANGELES, CALIFORNIA

HOLLOW BRICK AND TILE MOLDING MACHINE

Application filed March 19, 1929. Serial No. 348,186.

My invention relates to a machine for molding hollow brick and tile and the machine herein illustrated and described, is an improvement on a similar machine that forms the subject matter of a co-pending application for United States Letters Patent filed by me, July 22nd, 1927, Ser. No. 207,758.

The principal objects of my invention are, to generally improve upon and simplify the construction of the brick and tile molding machine disclosed in my aforesaid patent application as well as other existing forms of similar machines, further, to provide a brick and tile molding machine that may be readily combined with any of the various forms of auger or wire-cut brick and tile machines that are now on the market, and further, to provide a machine of the character referred to that is equipped with readily interchangeable parts, thereby enabling the same machine to be utilized for manufacturing various forms and sizes of hollow brick, tile and the like, and consequently effecting a material having in production costs and in the cost of equipment for manufacturing a variety of shapes and sizes of brick, blocks and tile.

Further objects of my invention are, to provide simple and efficient means for effecting proper lubrication of the dies and molds and cores during the shaping of the plastic material of the bricks or tiles, such lubrication being delivered unto both external and internal surfaces of the walls of the brick or tile, further, to provide interchangeable cores that are utilized in connection with interchangeable molds in properly shaping the plastic material that passes through the machine and, further, to construct the cores and molds so that they will permit the walls of clay that are being formed into the hollow brick or tile, to expand slightly in the zone of high pressure, thereby counteracting any tendency of the walls of the brick or tile to fracture or break while in the process of formation.

A further object of my invention is to arrange within the machine between the cores and mold and the screws or auger of the clay mixing and delivering machine, suitable means for breaking up the laminations that are produced by the screw or auger, thereby causing the clay to travel in a continuous column into and through the forming machine and consequently enabling said machine to produce solid homogeneous bodies in the brick or tile.

A further object of my invention is, to mount the cores or anchors or base members and to arrange the latter within the throat of the forming machine, which anchors are secured in the machine without the use of bolts, keys or the like, and said anchors being rigidly secured within the machine, when the two parts of the housing thereof are closed.

A further object of my invention is, to construct the molding machine housing in two main parts, that are detachably connected, to each other by pairs of hinges or bolts and one of the principal parts of the housing being connected to the mixing or delivery machine by bolts or hinges, which arrangement enables the improved machine to be readily combined with any standard form of mixing machine and likewise enables the interchangeable molds and cores to be readily placed within or removed from said machine.

With the foregoing and other objects in view, my invention consists in certain novel features of construction and arrangement of parts that will be hereinafter more fully described and claimed and illustrated in the accompanying drawings, in which:

Fig. 4 is a cross section taken on the line 4—4 of Fig. 1.

Fig. 5 is a cross section taken on the line 5—5 of Fig. 1 with parts broken away.

Fig. 6 is an enlarged cross section taken on the line 6—6 of Fig. 1.

Fig. 7 is an enlarged cross section taken on the line 7—7 of Fig. 1.

Fig. 8 is a vertical section through the mold box and showing the form of mold arranged therein for producing hollow tile.

Fig. 9 is a perspective view of a hollow tile produced by my improved machine.

Fig. 10 is a perspective view of the lamination breaker that is utilized in the throat of my improved machine.

Figure 1:
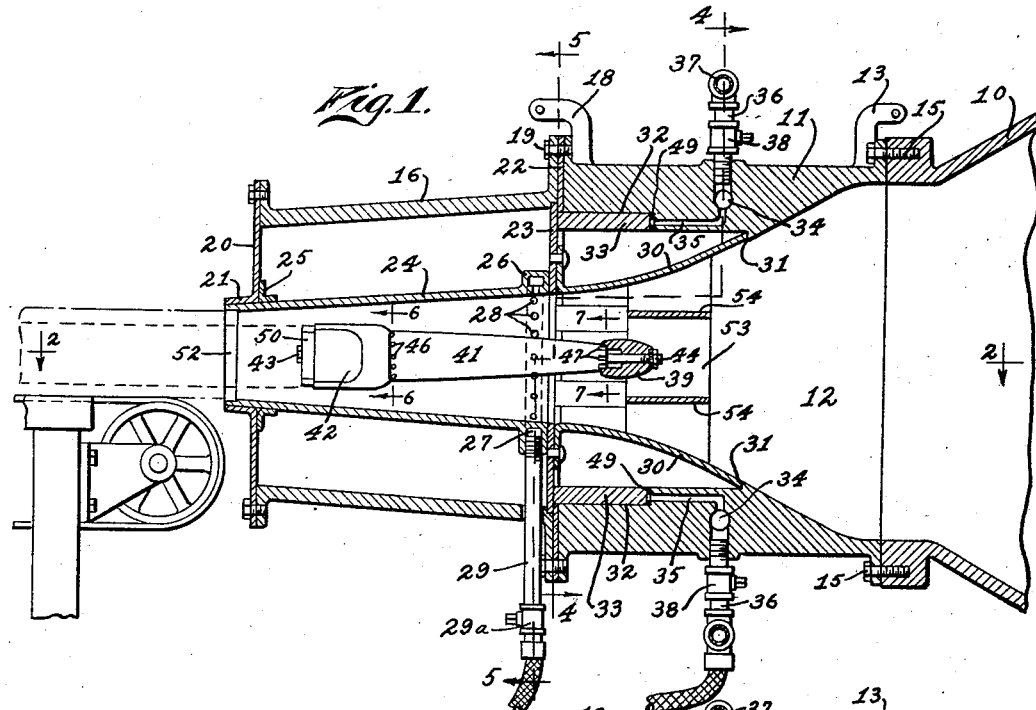
Fig. 1 is a vertical section taken lengthwise through the center of a brick and tile molding machine embodying the principles of my invention.

Referring by numerals to the accompanying drawings which illustrate a practical embodiment of my invention, 10 designates the discharge end of a machine of the standard type used for mixing clay or mud that is to be shaped of the hollow brick or tile and detachably connected to the end of said machine is a substantially rectangular housing 11 having a tapered throat 12 that receives the clay or mud from the discharge end of the mixer 10.

Formed on one side of the housing 11 are two or more hinge lugs 13 that may be connected to corresponding lugs 14 on the side or top of the machine 10, thus enabling the housing 11 to be swung laterally or upwardly depending upon the location of the lugs 14 or the housing 11 may be detachably connected to the machine 10 by bolts 15.

Arranged directly in front of the housing 11 is a mold housing 16 and formed on one side thereof and at its inner end are two or more hinge lugs 17 that may be connected to corresponding lugs 18 that are secured on the outer end of housing 11.

As a result of this arrangement, the two parts of the housing are connected to each other by hinges, thereby facilitating manipulation, while the cores and molds and other interchangeable parts are being inserted or moved.

Bolts 19, which pass through flanges on the adjacent ends of the housings 11 and 16 are utilized to rigidly connect the two parts of the housing.

Detachably secured to the outer end of housing 16, is a face plate 20 provided at its center with an opening for the outer end of the interchangeable mold that is positioned within said housing and surrounding this opening is an outwardly projecting flange 21. Obviously different forms of face plates are utilized with different molds.

Interposed between the connected ends of the housings 11 and 16, is a gasket 22 and clamped between this gasket and the end of housing 16 is a removable plate 23, having formed in its center, an opening that corresponds with the external shape of the brick or tile that is to be produced. Obviously there is a number of these plates 23 and the same are interchangeable.

Removably positioned within the housing 16 is a mold or die 24 which gradually tapers in cross sectional dimensions toward its outer end, which die is designed to give shape to the brick or tile that is produced by my improved machine.

The outer end of this mold or die projects through the flanged opening in the face plate 20 and secured on the outer portion of said mold is an external flange 25 that bears against the inner face of the face plate.

Formed integral with the inner end of the mold 24 and surrounding the same is a relatively small housing 26, within which is formed a circulation chamber 27, for the water or other liquid utilized as lubricant for the plastic material that passes through the machine and formed through the inner wall of the housing is a series of relatively small apertures 28.

Leading through the rear portion of the housing 16 is a liquid lubricant supply pipe 29 that is connected to a suitable source of supply and located in said pipe is a valve 29a that may be adjusted to regulate the flow of lubricant through said pipe.

Detachably secured to the rear face of plate 23, above and below the center opening therein, are the flanged forward ends of filler blocks or plates 30, which extend outwardly through the forward portion of the housing 11, and the rear ends of these filler plates are positioned behind shoulders 31 that are formed in the upper and lower faces of the throat 12.

These filler plates combine with the throat, in forming a chamber that gradually decreases in cross sectional area toward the plate 23 and thereby permits the plastic material to flow freely toward the die or mold without encountering any shoulders or passing into any lateral pockets.

The filler plates 30, are made in various sizes and are interchangeable with the different shapes and forms of molds.

Formed in the inner faces of the housing 11 are longitudinally disposed recesses 32, that are adapted to receive the ends of interchangeable cross bars, that function as core anchors. The inner portion of the side faces of these recesses are undercut so as to provide dovetail portions that are adapted to receive correspondingly shaped portions on the side faces of filler blocks 33, and which latter are utilized in those recesses that are not occupied by the ends of the core anchors. The filler blocks 33 are formed, so that they completely fill the recesses 32 and when positioned therein the outer ends of said filler blocks bear against plate 23.

Formed in the intermediate portion of housing 11 are lubricant distributing chambers 34 and leading therefrom to the bottoms of the recesses 34 are ducts 35.

Connected to housing and communicating with the chambers 34 therein, are branch pipes 36, that lead from a main supply pipe 37 and which latter is connected to a suitable source of supply and said connection being provided with a valve 38 which controls the flow of lubricant to the chambers 34 and the ducts leading therefrom.

The cores that project into the die or mold in my improved machine, are carried by core anchors 39, which are in the form of metal bars, of such length as to span the forward position of the throat and the ends of each anchor are provided with heads 40 that are adapted to be positioned in the recesses 32.

Secured to the body of the anchor, are one or more core bodies 41, which project into the adjacent mold or die 24 and which core body gradually increases in diameter toward its outer or forward end. Positioned on the outer or forward end of the core body is a head 42 that is shaped so as to give form to the opening in the brick or tile that is being produced and the core body and head are rigidly and detachably secured to the core anchor 39, by means of an axial bolt 43, that passes through said core body, head and anchor.

The threaded end of the bolt which projects beyond the anchor 39 receives a nut 44.

The opening 45 for the bolt through the core body 41 is larger in diameter than the bolt 43, thus providing a liquid lubricant circulation duct and at the outer end of the core body, this duct communicates with a series of radial ducts that are formed in said core body, or between said body and its head.

At the forward or inner end of the core body, duct 45 communicates with a series of radial ducts 47, which latter distribute liquid lubricant on the surface of the core body directly behind the anchor 39.

Leading from the lower ends of the recesses 32, with which the ducts 35 communicate, through the core anchor, are lubricant circulation ducts 48 that communicate with the rear end of the duct 45.

Located in the bottoms of the recesses 32 are gaskets 49, that are perforated so as to register with the correspondent ends of the ducts 35 and 48, thus minimizing leakage of lubricant at the points where said gaskets are located.

The extreme outer ends of the core heads 42 are recessed or cut away as designated by 50 and the inner face of the outer end of the mold or die 24 is correspondingly cut away or recessed, as designated by 52, thus forming slight clearances at the points where the plastic material leaves the core heads and the die and which arrangement permits the walls of the hollow brick or tile to expand while under highest pressure and such expansion counteracts any tendency of the plastic walls to break or fracture while leaving the die or mold.

Removably arranged within the throat 12, is a skeleton frame made up of a pair of spaced sheet metal plates 53, that are connected by a pair of transverse plates 54 and formed in the central portions of the plates 53 are notches for the accommodation of the core anchor 39.

This skeleton frame is designed to cut and break up the laminations in the mud or clay that is formed by the screw or auger within the mixing and feeding machine and, by thus breaking up the laminations, the plastic material will feed forwardly through the die or mold in a homogeneous mass and consequently produce hollow brick or tile and walls of uniform density and without layers which would otherwise result, if the laminations in the plastic material were not broken up and eliminated.

Figure 2:
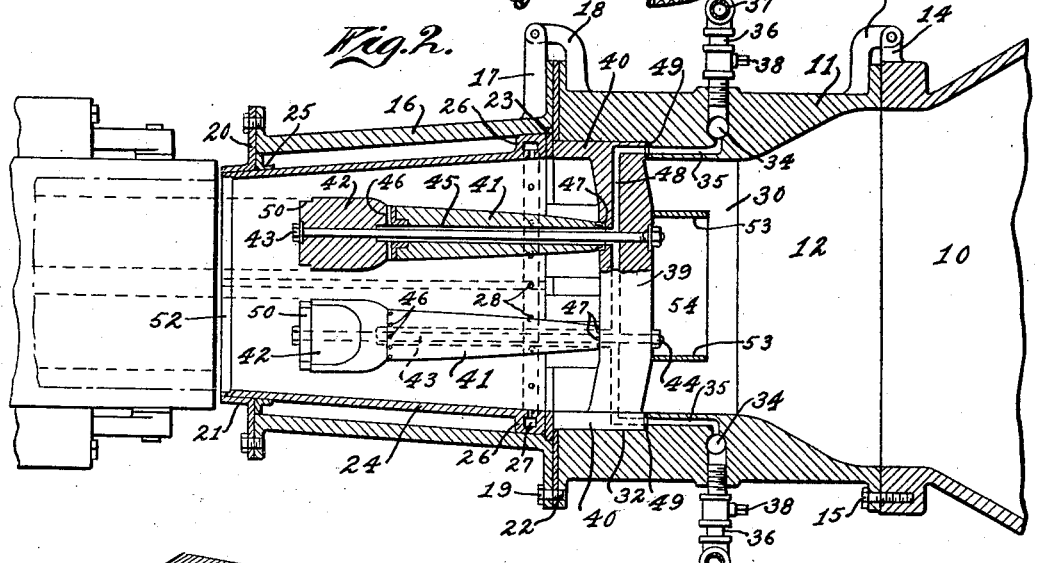
Fig. 2 is a horizontal section taken on the line 2—2 of Fig. 1.
Figure 3:
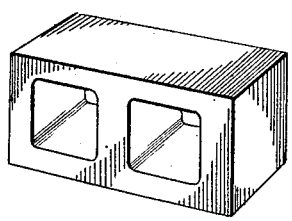
Fig. 3 is a perspective view of a hollow brick that is produced with my improved machine.

It will be understood that the core carrying anchors are capable of being interchangeably used in my improved machine and that they may be positioned vertically or transversely at the inner end of the throat, depending upon the brick or tile that is to be produced and one anchor may carry two cores for the manufacture of a hollow brick or block, as illustrated in Figs. 1, 2 and 3, or the anchor may carry a single core for the manufacture of hollow type as illustrated in Figs. 8 and 9.

In Fig. 4 I have illustrated by dotted lines two of the interchangeable core anchors positioned in the throat and where such arrangement is carried out, a hollow block having four openings will be produced. The hollow brick or tile that is produced in my machine may be delivered from the discharge end of the die or mold, directly into a suitable table, or endless conveyer as illustrated in Figs. 1 and 2.

The operation of my improved hollow brick or tile forming machine is as follows: When assembled for use, housing 11 is connected to the discharge end of the mixing machine by the hinges 13, or bolts 15 and the outer housing member 16 is secured to member 11 by the hinges 17, 18 or bolts 19 and one or more core carrying anchors are positioned in the forward end of member 11 with the core or cores carried by said anchor projecting outwardly into mold 24.

Those recesses 32, that are not filled with the end portions 40 of the core anchors are filled with the removable filler blocks 30. The lamination breaker is positioned in the throat in member 11, said breaker resting upon the core anchor and if there are two of the anchors in use, then the side plates 53 must be provided with two notches in order to accommodate said core anchors. The plastic material mixed within the machine 10, is forced outwardly therefrom by a screw or auger and, as this material passes through the throat into the mold the laminations produced by said screw or auger are broken up by the skeleton frame positioned against the core anchor and the plastic material is forced forwardly in a solid column past the core anchor and through the chamber with the mold and which chamber is occupied by cores 41.

Liquid lubricant, preferably water, enters the chambers 34 from the branch pipes 36 that are connected to main supply pipe 37 and this water flows from the chambers 34 through the ducts 35 and thence through the ducts 48 in the core anchors and from said ducts this water flows through the ducts 45 and from the latter ducts the water discharges through the jet openings 46 and 47, so as to effectively lubricate the plastic material as it passes lengthwise over the cores.

Simultaneous with this lubrication of the openings or chambers that are formed in the brick or tile that is being produced, the external surface of the column of plastic material will be effectively lubricated by water that enters the larger inlet end of the mold through the apertures 28, which latter lead from the circulation chamber 27 and the water for this lubrication entering said chamber through supply pipe 29.

At the point where the walls of the brick or tile that are being produced, leave the heads of the cores, the material adjacent to the inner surfaces of said walls may expand slightly outward, due to the formation of the recesses 50 at the ends of said heads and likewise the outer portions of the walls of the brick or tile may expand slightly outward at the points where they leave the outer end of the mold, due to the grooves or recesses 52 that are formed in the inner faces of the outer ends of the walls of the mold.

By thus permitting both inner and outer surfaces of the walls of the brick or tile to expand slightly, at the points where they leave the heads of the cores and the outer end of the mold, there is no tendency of the walls of the brick or tile to break or fracture as the column of plastic material leaves the machine.

The column of formed plastic material upon discharging from the forward end of the mold, is received upon a suitable table or endless carrier and, with suitable mechanism, said column is cut into sections of the desired length.

Thus it will be seen that I have provided a hollow brick tile and molding machine that is relatively simple in construction, inexpensive of manufacture and operation and which is very effective in performing the functions for which it is intended.

The molding machine may be conveniently employed with all standard forms of brick and tile machines now in general use and, by forming the body of the machine in two main parts and connecting the same by hinges, the manipulation of the machine while changing cores and dies may be conveniently and readily accomplished.

The housing of my improved machine is constructed so as to readily receive interchangeable cores and dies, thus enabling practically all forms of hollow bricks, blocks and tile to be produced on the machine and by effecting a thorough lubrication of the plastic material as the same passes through the machine and permitting the walls of the product to expand in both directions at the termination of the forming or shaping operations, the losses of the manufactured product due to breakage due to fracture of the walls is reduced to a minimum.

It will be understood that minor changes in the size, form and construction of the various parts of my improved hollow brick and tile molding machine may be made and substituted for those herein shown and described without departing from the spirit of my invention, the scope of which is set forth in the appended claims,

I claim as my invention:

1. The combination with a plastic material, mixing and feeding machine of a two-part housing hinged to said machine the two parts of said housing being hinged to each other, a mold detachably arranged in the outer portions of said housing, a core removably positioned within said housing and means for delivering lubricating fluid to the front and rear portions of the external surfaces of the core and the rear portions of the internal surfaces of said mold.

2. In a hollow brick and tile molding machine, a housing comprising detachably connected inner and outer parts, a mold removably positioned in the outer part the inner ends of the walls of said mold being provided with a liquid lubricant circulation duct, and there being ports formed through the walls of the mold and leading from said duct to the inner surfaces of said walls, a core anchor removably arranged in the inner part, a core detachably mounted on said anchor and projecting into said mold and means for delivering lubricating liquid onto the external surfaces of the front and rear portions of said core.

3. In a hollow brick and tile molding machine, a housing comprising detachably connected inner and outer parts, a mold removably arranged within the outer part, there being recesses formed in the inner faces of the walls of the inner part, a core anchor having its ends removably arranged in a pair of the recesses in said inner member, a core detachably secured to said anchor and projecting into the mold and filler blocks adapted to be positioned in those recesses that are not occupied by the ends of the core anchor.

4. In a hollow brick and tile molding machine, a housing comprising detachably connected inner and outer parts, a mold removably arranged within the outer part, there being recesses formed in the inner faces of the walls of the inner part, a core anchor having its ends removably arranged in a pair of the recesses in said inner member, a core detachably secured to said anchor and projecting into the mold, filler blocks adapted to be positioned in those recesses that are not occupied by the ends of the core anchor, there being liquid lubricant ducts formed in said anchor and core and liquid lubricant ducts leading through the walls of the said inner member to the lower ends of the recesses that are formed therein.

5. In a hollow brick and tile molding machine, a core comprising a separately formed body and a head the forward end of said head being provided with a plastic material expansion groove, an anchor and means for detachably connecting said core body and head to said anchor.

6. In a hollow brick and tile molding machine, a core comprising a separately formed body and a head the forward end of said head being provided with a plastic material expansion groove, an anchor and said anchor and core body being provided with liquid lubricant circulation ducts.

7. In a hollow brick and tile molding machine, a core anchor, a core comprising a body and a head detachably secured to said anchor the forward end of said head being provided with a plastic material expansion groove, said anchor and core body being provided with liquid lubricant circulation ducts and liquid lubricant discharge apertures leading from the circulation duct in the core body at both ends thereof.

8. In a machine of the class described, a mold, a core projecting there into and which core and mold are provided with plastic material expansion grooves at their outer ends.

9. In a hollow brick and tile molding machine, a housing formed in two parts, a plate removably arranged by the said parts, a pair of filler plates removably connected to said plate and extending into one of the parts of said housing, a mold removably arranged within the other part of the housing and a core anchored in the part of the housing into which said filler plates project, which core projects into said mold.

10. In a hollow brick and tile molding machine, a housing, a mold removably positioned therein, the walls at the receiving end of which mold are provided with a liquid lubricant circulation duct that encompasses the receiving end of said mold, there being discharge openings leading from said duct to the inner surface of the mold and means for delivering liquid lubricant to said duct.

11. In a hollow brick and tile molding machine, a housing, a mold removably positioned therein, the walls at the receiving end of which mold are provided with a liquid lubricant circulation duct that encompasses the receiving end of said mold, there being discharge openings leading from said duct to the inner surface of the mold, means for delivering liquid lubricant to said duct, a core projecting into said mold and means for delivering liquid lubricant onto the outer surfaces of the rear end portions of said core.

12. In a hollow brick and tile molding machine, a housing formed in two parts that are detachably connected to each other, a mold removably positioned in the outer one of the two parts of the housing, means for inserting liquid lubricant unto the inner surfaces of the rear portions of the walls of said mold, a core anchor removably positioned in the inner one of the two parts of the housing a sectional core detachably connected to said anchor and projecting into said mold and means for delivering liquid lubricant unto the rear portion of the surface of said core.

13. In a hollow brick and tile molding machine, a housing formed in two parts that are detachably connected to each other, one of said parts being provided adjacent to the joint between the two parts with recesses, a core anchor having its ends removably seated in said recesses, a sectional core detachably connected to said core anchor and communicating ducts formel in one of the parts of the housing, the core anchor and the sectional core for delivering liquid lubricant to the external surfaces of the core adjacent to its ends.

14. In a hollow brick and tile molding machine, a housing formed in two parts that are detachably connected to each other, one of said parts being provided adjacent to the joint between the two parts with recesses, a core anchor having its ends removably seated in said recesses, a sectional core detachably connected to said core anchor, communicating ducts formed in one of the parts of the housing, the core anchor and the sectional core for delivering liquid lubricant to the external surfaces of the core adjacent to its ends and the free end of the core being provided with an expansion groove.

15. In a hollow brick and tile molding machine, a housing formed in two parts that are detachably connected to each other, a mold arranged within said housing, the inner end of which mold terminates adjacent to the joint between the parts of said housing, there being a liquid lubricant circulation duct and ports formed in the inner end portion of the mold, a core anchor having its ends removably seated in recesses in the walls of the housing adjacent to the joint between the parts thereof, a sectional core detachably connected to said anchor and there being communicating circulation ducts formed in one of the parts of the housing, the core anchor and the core for delivering liquid lubricant to the external surface of the core adjacent to the ends thereof.

In testimony whereof I affix my signature.

LARS FRANDSEN.